Patented May 5, 1953

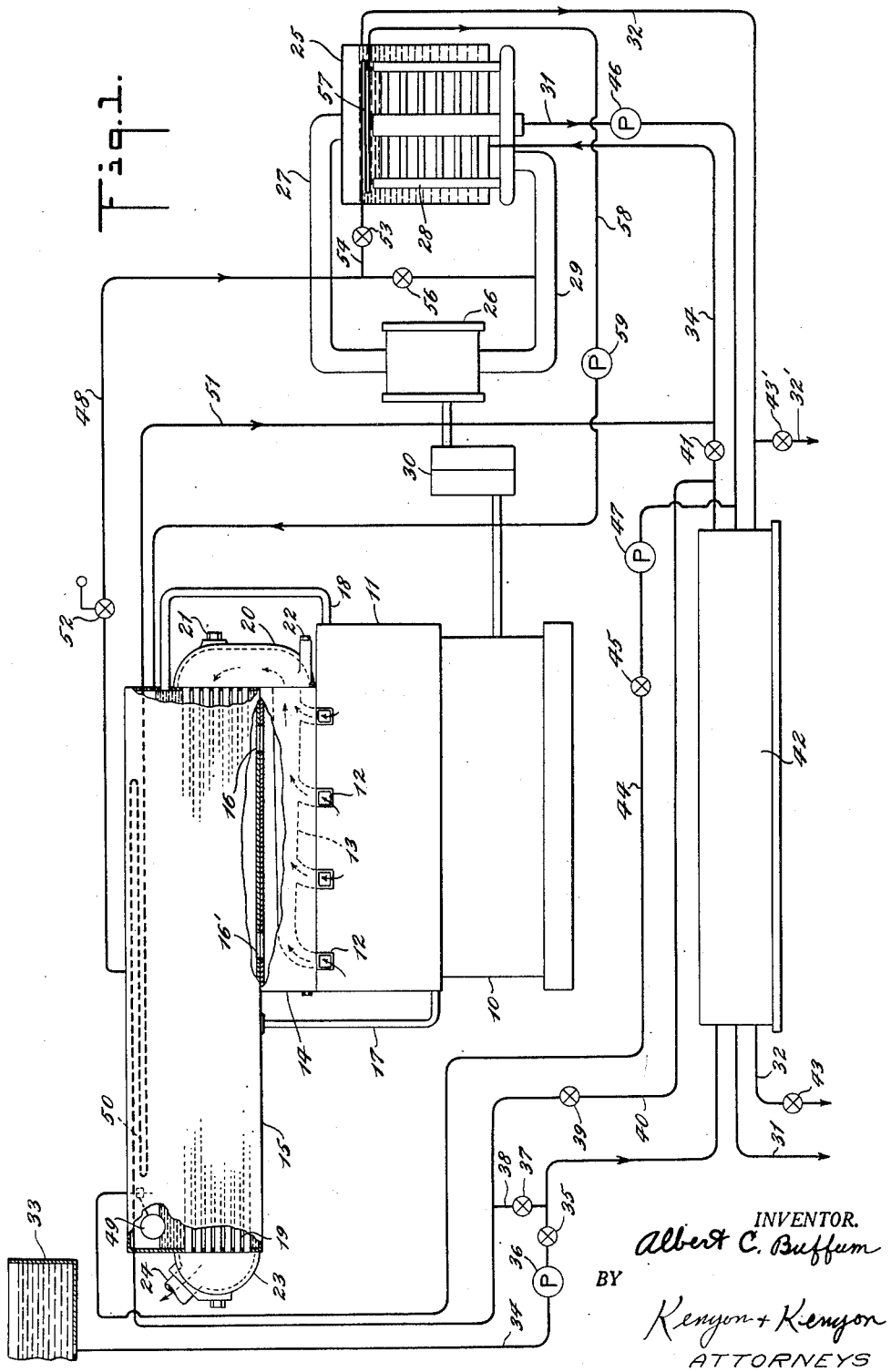

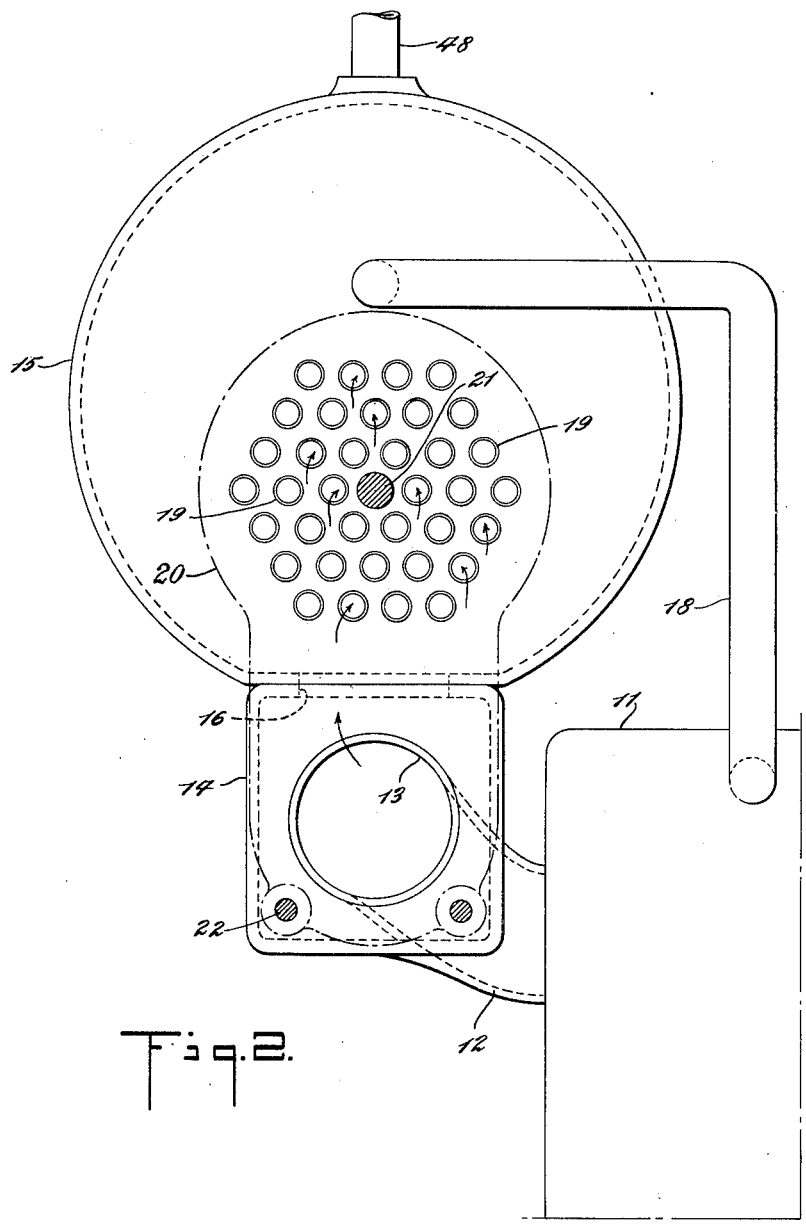

2,637,305

UNITED STATES PATENT OFFICE 2,637,305

HEAT EXCHANGER FOR INTERNAL-COMBUSTION ENGINES

Albert C. Buffum, Winchester, Mass., assignor, by mesne assignments, to Badger Manufacturing Company, Cambridge, Mass., a corporation of Massachusetts Application March 30, 1950, Serial No. 152,867

2 Claims. (Cl. 122—149)

This invention relates to heat exchange and distillation apparatus and is a division of my application Ser. No. 592,573 filed May 8, 1945 for Heat Exchange and Heat Transfer Method and Apparatus. It relates particularly to such apparatus in combination with an internal combustion engine for the accumulation and recovery of heat derived during operation of the engine and for the practical utilization of such heat.

It is a purpose of this invention to provide improved apparatus for utilizing heat generated during the operation of an internal combustion engine. It is a further purpose of this invention to provide improved apparatus for utilizing heat generated during the operation of an internal combustion engine in carrying out a distillation operation, particularly a distillation operation of the vapor compression type wherein vapor evolved from a solution in a vaporization chamber is compressed until its condensing temperature is above the boiling point of the solution in the vaporization chamber and the compressed vapor is condensed in out-of-contact heat exchange relation with the solution in the vaporization chamber.

In the operation of an ordinary liquid cooled internal combustion engine, the engine cooling liquid is directed through jacket means about the cylinder of the internal combustion engine where it is heated (thereby cooling the engine) and the liquid after having been heated is directed to a radiator, cool air being directed through the radiator so as to cool the engine cooling liquid before the liquid is returned to the engine jacket means. A large amount of the energy supplied by the fuel for the engine is wasted when the engine heat is thus dissipated to the atmosphere, and the total energy losses are even greater when power supplied by the engine is used to operate a fan or other blower for blowing air through the radiator to cool the engine cooling liquid.

It is a feature of the present invention that the engine cooling liquid, instead of being cooled after having become heated by heat generated during the operation of the engine, is further heated by heat exchange with the hot exhaust gases taken from the engine. In preferred embodiments of this invention the exhaust gases from the internal combustion engine are directed through a heat exchanger arranged within a boiler reservoir, which boiler reservoir is maintained in communication with the cooling jacket of the internal combustion engine by appropriate passages so that the heat that is recovered in cooling the engine cylinders and that is recovered from the exhaust gases will be accumulated and cause vaporization of the engine cooling liquid in the boiler reservoir. The resulting vapor can then be taken off and fresh engine cooling liquid supplied as necessary. According to certain embodiments of the invention the engine cooling liquid is likewise heated by direct contact with the exhaust manifold of the engine.

Further purposes and features of this invention will be apparent in connection with the following description of certain embodiments thereof which are shown merely for illustrative purposes in the accompanying drawing wherein, Fig. 1 is a side elevation of heat accumulator apparatus according to this invention wherein part is broken away to show a portion thereof in section and wherein certain elements of the apparatus are shown schematically as arranged for use in carrying out a distillation operation of the vapor compression type, and Fig. 2 is right hand end elevation of the engine heat accumulator with only a portion of the internal combustion engine shown and with the end exhaust gas head member removed.

In the apparatus shown in the drawing the internal combustion engine 10 is provided with a liquid containing jacket 11 which is disposed for peripherially cooling the cylinders of the internal combustion engine. The jacket may be disposed about the side walls of the cylinders in the cylinder block or in the cylinder head, and in the ordinary construction of an internal combustion engine the jacket is disposed so as to cool both the side walls and the head portion of the cylinders. The exhaust gases are emitted from the internal combustion engine through the outlets 12 and into the exhaust manifold 13 which is secured to the engine 10 by any suitable means not shown.

In the embodiment shown, the exhaust manifold 13 is disposed within a casing 14 which is made integral with the exhaust manifold as by welding. The casing is adapted to contain a liquid, and the liquid that is contained in the casing is disposed for peripherially cooling the exhaust manifold and for becoming heated by the hot gases discharged from the engine through the exhaust manifold.

Attached as by welding to the upper face of the casing 14 is the boiler reservoir 15. While the boiler reservoir 15 is shown attached in face-to-face contact with the casing 14 for optimum heat exchange efficiency, this is not essential and reservoir 15 can be spaced apart from the casing 14 if desired. The boiler reservoir 15 is adapted to contain engine cooling liquid. In order to afford free communication for liquid between the casing 14 and the boiler reservoir 15 there are openings 16, 16' which provide passage means whereby liquid from the boiler reservoir 15 is directed to the casing 14 and the heated liquid in the casing 14 together with any vapor commingled therewith is directed to the boiler reservoir 15. Similarly line 17 is arranged to direct liquid from the boiler reservoir 15 to the jacket 11, and the line 18 is arranged to direct liquid heated in jacket 11 and any vapor commingled therewith to the boiler reservoir 15.

Within the boiler reservoir 15 is a heat exchanger that is adapted to direct the hot combustion gases in out-of-contact heat exchange relation with the liquid in the boiler reservoir 15. In the embodiment shown this heat exchanger is in the form of a plurality of tubes 19 or other passages which extend horizontally from end to end of the boiler reservoir and are open ended to the exterior of the boiler reservoir. The exhaust gases are directed from the exhaust manifold to the tubes 19 by the head member 20 which can be secured in place by the bolts 21 and 22. The tubes 19 at the opposite end of the boiler reservoir may be left open to the atmosphere or may be covered with a head member 23 (which may also be secured in place by the bolt 21) from which the exhaust gases can be directed by a line 24 which can extend to any convenient place for venting the exhaust gases to the atmosphere.

The above described apparatus provides an engine heat accumulator and constitutes one of the features of this invention. By employment of the described apparatus the heat that is producing during the operation of the internal combustion engine can be recovered from the cylinder block and heads, from the exhaust manifold, and from the exhaust gases after they have left the exhaust manifold. The heat accumulator has the advantage of being compact, highly efficient, and easily adapted to varying designs of internal combustion engines.

The engine heat accumulator may be used for various purposes by supplying engine cooling liquid and taking off vapor from the boiler reservoir. According to further features of this invention the engine heat accumulator apparatus is employed in combination with distillation apparatus and the above described engine heat accumulator has been shown in the drawing, for illustrative purpose, as forming part of distillation apparatus of the vapor compression type.

The distillation apparatus shown in the drawing comprises a vaporization chamber 25 from which vapors are taken to the compressor 26 by the low pressure vapor line 27. The vapor that has been compressed by the compressor is directed to the condenser heat exchanger 28 by the compressed vapor line 29. The compressor is actuated by the internal combustion engine 10 through gearing 30 which may be employed if desired, and serves to compress the vapor withdrawn from the vaporization chamber until its condensing temperature is above the boiling point of the solution within the vaporization chamber. The vapor that condenses in the condenser heat exchanger 28 is taken off as condensate or distillate by the line 31. The concentrated solution is removed from the vaporization chamber 25 by the line 32.

The fresh solution to be distilled is introduced into the system from any suitable source of supply such as the supply tank 33 from which it is taken by the line 34 that is controlled by the valve 35. The feed may be a gravity feed or may be positively introduced by the pump 36. If the pump 36 is of the positive displacement type the rate of feed may be controlled by the rate of operation of the pump and the valve 35 may be dispensed with. In preferred practice of this invention the feed is passed directly into the vaporization chamber, the valve 41 being open, and the valves 37 and 39 in the lines 38 and 40 respectively being closed. Preferably, the incoming feed is preheated by out-of-contact counterflow heat exchange in preheater heat exchanger 42 with distillate removed from the condenser heat exchanger 28 and with hot concentrated solution withdrawn from the vaporization chamber 25. If desired, the extent of preheating the feed can be subject to control by regulating the amount of hot concentrated solution that is passed through the preheater heat exchanger by regulation of the valves 43 and 43' in the lines 32 and 32' respectively.

According to preferred practice of this invention a portion of the distillate is taken from the distillate draw off line 31 by the line 44 controlled by the valve 45 to the boiler reservoir and the quantity of distillate taken to the boiler reservoir 15 is substantially in excess of the quantity of the distillate that can be converted into vapor by the heat recovered from the internal combustion engine. In such case the boiler reservoir operates in a flooded condition and the unvaporized distillate together with vapor formed by reason of recovery of engine heat by the engine heat accumulator is taken by the line 48 so that it will reenter the condenser heat exchanger 28 wherein the vapor is condensed and gives up its heat. (The float valve 49 and the pressure release valve 52, described below, in such case can be omitted and the valve 53 in the line 54 will be closed, the valve 56 being open.)

For directing a portion of the distillate to the boiler reservoir to act as engine cooling liquid any suitable arrangement may be shown. When the main portion of the distillate is directed through a preheater heat exchanger such as the preheater heat exchanger 42 and when there is substantial frictional resistance to the flow of the distillate through the preheater heat exchanger, a pump 46 can conveniently be employed in the line 31 so as to force the distillate through the preheater heat exchanger and in such case there will be sufficient back pressure developed so that by regulation of the valve 45 a desired quantity of distillate can be caused to flow through the line 44 to the boiler reservoir. Alternatively a pump 47 may be placed in the line 44 and the pump 46 omitted, or both of the pumps 46 and 47 may be used. Ordinarily it is regarded as preferable to omit the pump 47 and to employ the pump 46.

It is apparent that by utilizing the apparatus above described the engine heat that is recovered from the internal combustion engine by the engine heat accumulator, is transferred to the vaporization chamber of the distillation unit using engine cooling liquid as the heat transferring medium. It is also apparent that this result is achieved by use of a portion of the distillate recovered from the condenser heat exchanger, this portion of the distillate being in effect indefinitely recycled in a closed circuit. By maintaining the quantity of the distillate in excess of that which is vaporized due to the heat recovered from the internal combustion engine, the system automatically compensates for any variations in the action of the internal combustion engine and the operating parts of the apparatus are extremely simple.

The operation of the above described apparatus may be illustrated in connection with a typical distillation operation involving the recovery of distilled water from sea water. Fresh solution (raw sea water) is fed into the system as the rate of about 1225 pounds per hour. The recovered distillate amounts to 625 pounds per hour and the concentrated solution that is discharged amounts to 600 pounds per hour. About 3.6 pounds per hour of gasoline are furnished to the internal combustion engine and upon combustion supply about 68,500 B. t. u. per hour. When an internal combustion engine of normal efficiency is used, the mechanical energy supplied to the compressor 26 corresponds to about 17,000 B. t. u. per hour. The balance is "waste heat" which in conventional equipment is dissipated to the atmosphere, and when a mechanically operated fan is employed to blow air through a radiator to cool the engine cooling liquid, the mechanical energy that can be supplied to the compressor 26 is reduced below the figure just given. According to the present invention these large losses in energy supplied by the fuel consumed in the operation of the internal combustion engine are prevented to a very great extent. Thus, according to the example above mentioned 60 pounds per hour of distillate are taken by the line 44 to the engine heat accumulator. In the engine heat accumulator about 18,000 B. t. u. per hour are recovered from the engine jacket and about 27,600 B. t. u. per hour are recovered by heat exchange with the hot exhaust gases. The recovered engine heat causes vaporization of the distillate so that there flows through the line 48 to the condenser heat exchanger 28 about 48 pounds per hour of steam and about 12 pounds per hour of water which has not been converted into steam in the engine heat accumulator. The steam condenses in the condenser heat exchanger 28 and gives up its heat to the solution in the vaporization chamber 25 so that the 60 pounds per hour of distillate is reintroduced into the distillate stream flowing from the condenser heat exchanger 28 and can be recycled again through the engine heat accumulator. It is to be noted that the heat losses from the heat supply by the fuel consumed by the internal combustion engine has been reduced from about 51,500 B. t. u. per hour or greater to about 5,900 B. t. u. per hour and that the recovered engine heat has been put to useful service in effecting the distillation operation.

In the above described operation the vapor supplied to the condenser heat exchanger 28 from the boiler reservoir 15 should be at a pressure such that its condensing temperature will be above the boiling point of the solution in the vaporization chamber. This can be insured in any suitable way as by the action of either or both of the pumps 46 and 47 above described.

If desired the system can be operated so that all of the distillate that is taken from the line 31 by the line 44 is vaporized before being returned to the condenser heat exchanger 28. This can be readily accomplished by the employment of the float valve 49 for controlling the flow of distillate to the boiler reservoir 15 so as to be merely sufficient to compensate for the liquid that is vaporized in the engine heat accumulator and the resulting vapor, unmixed with unvaporized liquid, would be directed by the line 48 to the condenser heat exchanger 28.

If it is desired to utilize the heat contained in the vapor that is produced by vaporization of engine cooling liquid in the engine heat accumulator for the purpose of supplying the heat recovered from the engine without, however, commingling the condensed vapor with the distillate produced in the condenser heat exchanger 28, the vapor generated in the engine heat accumulator can be brought into out-of-contact heat exchange relation with solution within the vaporization chamber 25 in other ways as by closing the valve 56 and opening the valve 53 in line 54 which leads to the coil 57 within the vaporization chamber, the coil 57 serving as an independent condenser heat exchanger. The condensate formed in the coil 57 can be returned to the boiler reservoir 15 by the line 58 using a pump 59 if desired. In such case the distillate taken off from line 31 by line 44 would merely act as make up liquid to compensate for any liquid losses from the heat accumulator circuits. Alternatively, the make up liquid could be supplied from an independent source, e. g. when the engine cooling liquid is a liquid other than the distillate formed in the condenser heat exchanger 28. For such uses the boiler reservoir may be maintained flooded or with a constant liquid level maintained therein as above described.

The engine heat accumulator can be used in ways other than those which have been described above. For example, the engine heat accumulator can be employed to assist in preheating all or a portion of the incoming feed as disclosed in the Kleinschmidt Patent No. 2,280,093. Thus by opening valve 37 in line 38 and partially opening the valve 41 (the valve 39 being closed) a portion of the incoming feed can be diverted so as to pass through the coil 50 in the upper portion of the boiler reservoir 15 and so as to become preheated. The portion of the feed preheated in coil 50 is then directed by line 51 back to the main feed line 34 where it is commingled with the portion of the incoming feed that is preheated in the preheater heat exchanger 42. Alternatively, by closing the valves 37 and 41 and opening the valve 39 the incoming feed can be directed in series through the preheater heat exchanger 42 and through the coil 50.

When the engine heat recovered by the engine heat accumulator is used to preheat the incoming feed as above described all or substantially all of the recovered heat can be utilized in this way. In such case the coil 50 acts as a condenser to condense the vapor produced in the boiler reservoir 15. In such an installation it is usually desirable to provide a safety valve to prevent creation of excessive pressures in the boiler reservoir and for this purpose a one way pressure relief valve 52 can be placed in the line 48 and any vented vapor will pass to the condenser heat exchanger 28. Alternatively if the amount and temperature of the incoming feed is insufficient to condense all of the vapor produced in the engine heat accumulator any excess vapor can be continuously vented from the boiler reservoir 15 through the line 48, the pressure relief valve 52 being adjusted to maintain a desired back pressure or being omitted. When the engine heat accumulator is employed to preheat incoming feed, the boiler reservoir is normally operated so as to maintain the liquid level therein constant as hereinabove described so that the coil 50 will be in the vapor space above the liquid level. However, the method of operation wherein the boiler reservoir is kept flooded may also be employed, although in such case it is essential that excess liquid or liquid commingled with any vapor that is formed be permitted to escape from the boiler reservoir as by the line 48.

While this invention has been described in connection with specific embodiments thereof, it is to be understood that this has been done merely for illustrative purposes. Accordingly the practice of this invention may be varied within the scope thereof defined by the language of the following claims.

I claim:

1. An engine heat accumulator of the character described comprising in combination with an internal combustion engine, liquid-containing jacket means disposed for peripheral cooling of the cylinders of said internal combustion engine, a liquid-containing boiler reservoir, means for directing liquid from said boiler reservoir to said jacket means, means for directing heated liquid from said jacket means to said boiler reservoir, means for directing exhaust gases from said internal combustion engine in out-of-contact heat exchange relation with liquid within said boiler reservoir to supply heat to the liquid within said reservoir, an exhaust manifold between said internal combustion engine and said boiler reservoir, a liquid-containing casing disposed for peripheral cooling of said exhaust manifold, means for directing liquid from said boiler reservoir into said casing, and means for directing heated liquid from said casing into said boiler reservoir.

2. An engine heat accumulator comprising in combination with an internal combustion engine having an exhaust manifold, a liquid-containing casing disposed for peripheral cooling of said exhaust manifold, a liquid-containing boiler reservoir carried by and above said casing, passage means between said casing and said reservoir providing inter-communication for the liquid between said casing and said boiler reservoir, a heat exchanger within said boiler reservoir, means for directing exhaust gases from said exhaust manifold through said heat exchanger in out-of-contact heat exchange relation with solution within said boiler reservoir, liquid-containing jacket means disposed for peripheral cooling of the cylinders of said internal combustion engine, passage means between said jacket means and said boiler reservoir providing inter-communication for liquid between said jacket means and said boiler reservoir, means for feeding engine-cooling liquid to said boiler reservoir, and means for directing vapor from said reservoir.

ALBERT C. BUFFUM.

References Cited in the file of this patent

UNITED STATES PATENTS

| Number | Name | Date |
|---|---|---|
| 1,495,088 | Larson | May 20, 1924 |
| 1,529,070 | Lea | Mar. 10, 1925 |
| 1,827,113 | Sanftleben | Oct. 13, 1931 |

FOREIGN PATENTS

| Number | Country | Date |
|---|---|---|
| 150,004 | Germany | of 1904 |
| 525,637 | Germany | of 1931 |
| 353,613 | France | of 1905 |
| 95,448 | Switzerland | July 17, 1922 |
| 111,854 | Switzerland | of 1925 |